US012299802B2

(12) United States Patent
Wang et al.

(10) Patent No.: US 12,299,802 B2
(45) Date of Patent: May 13, 2025

(54) IMAGE PROCESSING METHOD, APPARATUS AND ELECTRONIC DEVICE (71) Applicant: Beijing Zitiao Network Technology Co., Ltd., Beijing (CN)

(72) Inventors: Can Wang, Beijing (CN); Jiali Pan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/000,244

(22) PCT Filed: Sep. 30, 2022

(86) PCT No.: PCT/CN2022/123543
§ 371 (c)(1),
(2) Date: Nov. 29, 2022

(87) PCT Pub. No.: WO2023/173727
PCT Pub. Date: Sep. 21, 2023

(65) Prior Publication Data
US 2024/0212256 A1 Jun. 27, 2024

(30) Foreign Application Priority Data
Mar. 16, 2022 (CN) .......................... 202210262157.6

(51) Int. Cl.
*G06T 15/04* (2011.01)
(52) U.S. Cl.
CPC .................... *G06T 15/04* (2013.01)
(58) Field of Classification Search
CPC ..... G06T 15/04; G06T 19/00; G06T 2215/12; G06T 17/00; H04W 76/15; H04L 63/104; H04L 9/3234
See application file for complete search history.

(56) References Cited

U.S. PATENT DOCUMENTS 10,043,233 B1    8/2018   Beri et al.
11,273,074 B1 *  3/2022   Homer .................. G16H 20/40
(Continued)

FOREIGN PATENT DOCUMENTS

CN    102682477 A    9/2012
CN    106683165 A    5/2017
(Continued)

OTHER PUBLICATIONS

European Patent Office, Extended European Search Report Issued in Application No. 22808577.5, Jan. 2, 2024, 8 pages.
(Continued)

*Primary Examiner* — Ming Wu
(74) *Attorney, Agent, or Firm* — Alleman Hall & Tuttle LLP (57) ABSTRACT The present disclosure provides an image processing method, an apparatus and an electronic device. The method includes: determining N texture images corresponding to a first image, and a correspondence between the N texture images and N model faces of a three-dimensional model, where N is an integer greater than 1; determining, according to the correspondence and an offset coefficient, a mapping region corresponding to each model face in the N texture images, where the mapping region is at least partial region of a texture image; mapping regions in the N texture images to the three-dimensional model to obtain a three-dimensional image corresponding to the first image. A display effect of the three-dimensional image is improved and flexibility of three-dimensional image acquisition is improved.

20 Claims, 5 Drawing Sheets

(56) References Cited

U.S. PATENT DOCUMENTS

| | | | | |
|---|---|---|---|---|
| 2013/0173300 A1* | 7/2013 | Hyde | ............ | G16H 30/20 |
| | | | | 705/3 |
| 2013/0201187 A1* | 8/2013 | Tong | ............ | G06V 40/172 |
| | | | | 345/420 |
| 2013/0242110 A1* | 9/2013 | Terre | ............ | H04N 23/50 |
| | | | | 29/592.1 |
| 2015/0187126 A1 | 7/2015 | Magder et al. | | |
| 2016/0086299 A1 | 3/2016 | Sharma et al. | | |
| 2017/0039755 A1 | 2/2017 | Heggelund et al. | | |
| 2017/0109568 A1* | 4/2017 | Escalier | ............ | G06V 40/165 |
| 2018/0174352 A1 | 6/2018 | Kang | | |
| 2020/0202619 A1 | 6/2020 | Sheng | | |
| 2022/0075453 A1* | 3/2022 | Huang | ............ | G06T 7/74 |
| 2022/0076044 A1* | 3/2022 | Peters | ............ | G06F 17/153 |
| 2022/0076117 A1* | 3/2022 | Amon | ............ | G06T 7/70 |

FOREIGN PATENT DOCUMENTS

| | | |
|---|---|---|
| CN | 109427087 A | 3/2019 |
| CN | 106127681 B | 8/2019 |
| CN | 111369659 A | 7/2020 |
| CN | 114140568 A | 3/2022 |
| CN | 114596399 A | 6/2022 |
| JP | 2009003708 A | 1/2009 |
| JP | 2018200504 A | 12/2018 |
| JP | 2019192299 A | 10/2019 |

OTHER PUBLICATIONS

Purnomo, B. et al., "Seamless Texture Atlases," Proceedings of the Second Eurographics Symposium on Geometry Processing, Jul. 8, 2004, Nice, France, 10 pages.

"CubeMap Sampling Process" Computer Graphics, available as early as Jun. 17, 2021, 14 pages.

ISA China National Intellectual Property Administration, International Search Report and Written Opinion Issued in Application No. PCT/CN2022/123543, Nov. 28, 2022, WIPO, 12 pages.

Communication pursuant to Article 94(3) EPC for European Application No. 22808577.5, mailed Oct. 28, 2024, 6 pages.

China National Intellectual Property Administration, Office Action and Search Report Issued in Application No. 202210262157.6, Feb. 27, 2025, 17 pages.

Mao, Y. et al., "Efficient Retrieval of 3D Models Based on Depth Weighted Normal Map," Journal of Computer-Aided Design & Computer Graphics, vol. 17, No. 2, Feb. 20, 2005, 6 pages. English abstract.

* cited by examiner

IMAGE PROCESSING METHOD, APPARATUS AND ELECTRONIC DEVICE

CROSS-REFERENCE TO RELATED APPLICATION

The present disclosure is a National Stage of International Application No. PCT/CN2022/123543, filed on Sep. 30, 2022, which claims priority to Chinese Patent Application No. 202210262157.6, filed to China National Intellectual Property Administration on Mar. 16, 2022 and entitled "Image Processing Method, Apparatus and Electronic Device". The content of the above applications are is incorporated by reference in their entireties.

TECHNICAL FIELD

The present disclosure relates to the field of image processing technology and, in particular, to an image processing method, an apparatus, an electronic device, a computer-readable storage medium, a computer program product and a computer program.

BACKGROUND

A terminal device can make a virtual reality (Virtual Reality, VR) video by a cube-mapping (Cube-mapping) method. For example, the terminal device pastes 6 texture images corresponding to a two-dimensional image on six faces of a cube to obtain a VR image corresponding to the two-dimensional image and then obtain a virtual reality video.

At present, vertex texture coordinates of each face of a model can be preset, and the model can acquire multiple regions in texture images according to the preset vertex texture coordinates and map them to the model to obtain a VR image. For example, when a cube model receives 6 texture images, the cube model can acquire target regions in the 6 texture images respectively according to preset vertex texture coordinates of each face, and then map 6 target regions to 6 faces to obtain a VR image. However, according to the above method, the regions acquired by the model in the texture images according to the preset vertex texture coordinates are fixed and unchanged, which leads to poor flexibility of VR image acquisition.

SUMMARY

The present disclosure provides an image processing method, an apparatus, an electronic device, a computer-readable storage medium, a computer program product and a computer program for solving the technical problem of poor flexibility of VR image acquisition in the prior art.

In a first aspect, an embodiment of the present disclosure provides an image processing method, which includes:
  determining N texture images corresponding to a first image, and a correspondence between the N texture images and N model faces of a three-dimensional model, where N is an integer greater than 1;
  determining, according to the correspondence and an offset coefficient, a mapping region corresponding to each of the model faces in the N texture images, where the mapping region is at least partial region of a texture image;
  mapping regions in the N texture images to the three-dimensional model to obtain a three-dimensional image corresponding to the first image.

In a second aspect, an embodiment of the present disclosure provides an image processing apparatus, which includes a first determining module, a second determining module and a mapping module, where:
  the first determining module is configured to determine N texture images corresponding to a first image, and a correspondence between the N texture images and N model faces of a three-dimensional model, where N is an integer greater than 1;
  the second determining module is configured to determine, according to the correspondence and an offset coefficient, a mapping region corresponding to each of the model faces in the N texture images, where the mapping region is at least partial region of a texture image;
  the mapping module is configured to map mapping regions in the N texture images to the three-dimensional model to obtain a three-dimensional image corresponding to the first image.

In a third aspect, an embodiment of the present disclosure provides an electronic device, which includes: a processor and a memory;
  the memory stores computer execution instructions;
  the processor executes the computer execution instructions stored in the memory, so that the processor executes the image processing method as described in the first aspect above and in various possible designs of the first aspect.

In a fourth aspect, an embodiment of the present disclosure provides a computer-readable storage medium having computer execution instructions stored therein, where the image processing method as described in the first aspect above and in various possible designs of the first aspect is implemented when a processor executes the computer execution instructions.

In a fifth aspect, an embodiment of the present disclosure provides a computer program product including a computer program, where the image processing method as described in the first aspect above and in various possible designs of the first aspect is implemented when the computer program is executed by a processor.

In a sixth aspect, an embodiment of the present disclosure provides a computer program, where the image processing method as described in the first aspect above and in various possible designs of the first aspect is implemented when the computer program is executed by a processor.

The present disclosure provides an image processing method, an apparatus, an electronic device, a computer-readable storage medium, a computer program product and a computer program. N texture images corresponding to a first image, and a correspondence between the N texture images and N model faces of a three-dimensional model are determined, where N is an integer greater than 1: a mapping region corresponding to each of the model faces is determined in the N texture images according to the correspondence and an offset coefficient, where the mapping region is at least partial region of a texture image: mapping regions in the N texture images are mapped to the three-dimensional model to obtain a three-dimensional image corresponding to the first image. In the above method, a terminal device can acquire the mapping regions in the texture images flexibly through the correspondence and the offset coefficient, thereby improving flexibility of VR image acquisition and improving a display effect of a VR image.

DESCRIPTION OF EMBODIMENTS

Exemplary embodiments will be described in detail here, and examples thereof are shown in the accompanying drawings. When the following description refers to the drawings, unless otherwise indicated, the same number in different drawings indicates the same or similar elements. Implementations described in the following exemplary embodiments do not represent all implementations consistent with the present disclosure. On the contrary, they are only examples of apparatuses and methods consistent with some aspects of the present disclosure as detailed in the appended claims.

It should be noted that, the terms "including", "comprising" or any other variants thereof herein are intended to cover non-exclusive inclusion, so that a process, a method, an item or an apparatus including a series of elements not only includes those elements, but also includes other elements not explicitly listed, or also includes elements inherent to such process, method, item or apparatus. Without further restrictions, an element defined by a statement "including a/an/one . . . " does not exclude the existence of other identical elements in the process, method, item or apparatus including this element.

In the related art, a terminal device can paste multiple texture images corresponding to a two-dimensional image on model faces to obtain a VR image of the two-dimensional image. At present, vertex texture coordinates of each face of a model can be preset, and the model can acquire multiple regions in texture images according to the preset vertex texture coordinates and map them to model faces. For example, when a cube model receives 6 texture images, the cube model can acquire a target region in each texture image according to preset texture coordinates of each model face, and then map the obtained 6 target regions to the corresponding model faces. However, when the texture images have poor quality, the model can only acquire the regions in the texture images in the exact same way of acquiring according to the preset vertex texture coordinates, which leads to poor flexibility of VR image acquisition.

In order to solve the technical problem of poor flexibility of VR image acquisition in the related art, an embodiment of the present disclosure provides an image processing method. N texture images corresponding to a first image, and a correspondence between the N texture images and N model faces of a three-dimensional model are determined. The N texture images are combined into a region of L rows and K columns according to the correspondence to obtain a sampling region. Mapping regions corresponding to the model faces are determined according to the sampling region and an offset coefficient, where a mapping region is at least partial region of a texture image. The mapping regions in the N texture images are mapped to the three-dimensional model to obtain a three-dimensional image corresponding to the first image. In this way, when the texture images have poor quality, a terminal device can acquire the mapping regions in the texture images flexibly through the correspondence and the offset coefficient, which can not only improve a display effect of a VR image, but also improve the flexibility of VR image acquisition.

An application scenario of the present disclosure is described below in combination with FIG. 1.

Figure 1:
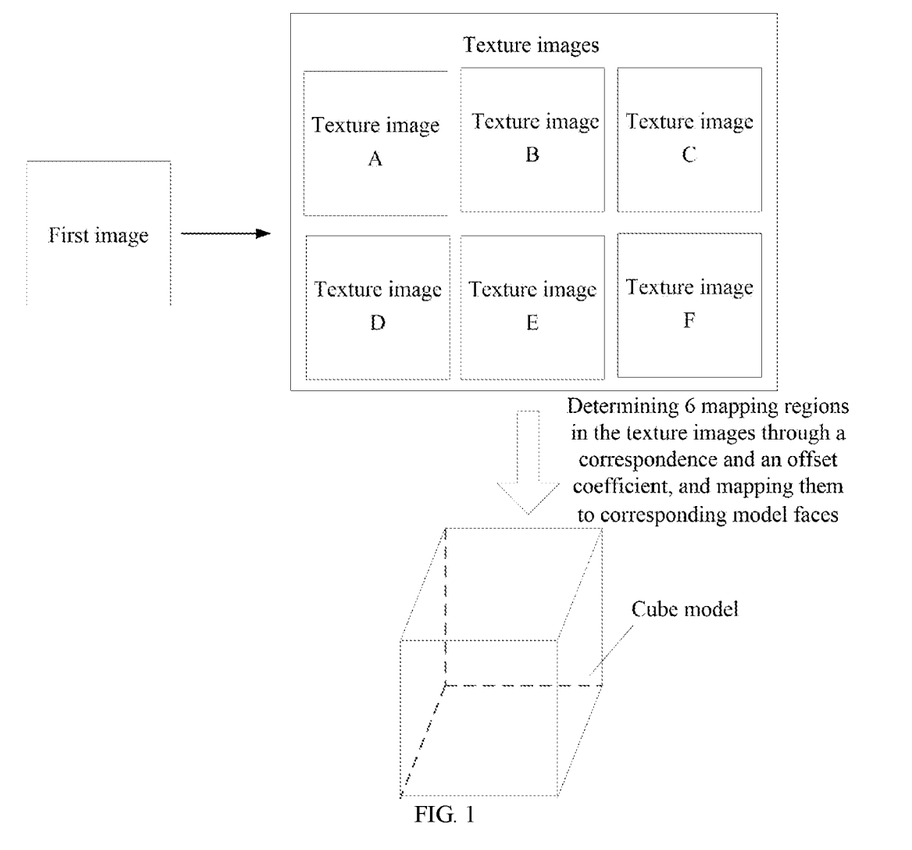
FIG. 1 is a schematic diagram of an application scenario provided by an embodiment of the present disclosure.

FIG. 1 is a schematic diagram of an application scenario provided by an embodiment of the present disclosure. Please refer to FIG. 1, which includes: a first image and a three-dimensional model. The three-dimensional model is a cube model. Texture images corresponding to the first image are acquired through a preset algorithm, where the texture images include texture image A, texture image B, texture image C, texture image D, texture image E and texture image F. A correspondence between each texture image and the model faces of the cube model is determined. Through the correspondence and an offset coefficient, 6 mapping regions are determined in the texture images, and the mapping regions are mapped to the corresponding model faces of the cube model to obtain a three-dimensional image corresponding to the first image. In this way, when acquiring the mapping regions of the model faces, the mapping regions can be flexibly adjusted through the correspondence and the offset coefficient, which can avoid occurrence of cracks between the model faces of the mapped three-dimensional image, thereby improving a display effect of the three-dimensional image and improving the flexibility of three-dimensional image acquisition.

Technical solutions of the present disclosure and how the technical solutions of the present disclosure solve the above technical problem are described in detail below with specific embodiments. The following specific embodiments can be combined with each other, and the same or similar concepts or processes may not be repeated in some embodiments. The embodiments of the present disclosure will be described below in combination with the accompanying drawings.

Figure 2:
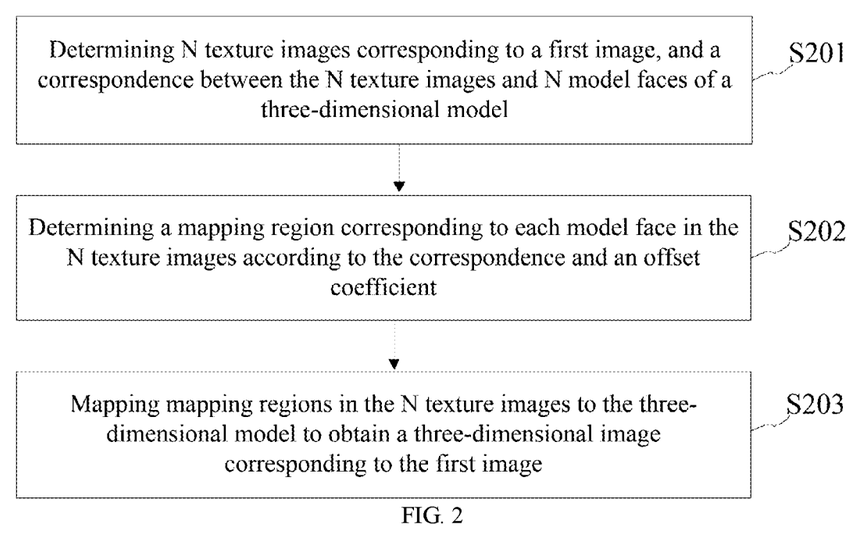
FIG. 2 is a schematic flow diagram of an image processing method provided by an embodiment of the present disclosure.

FIG. 2 is a schematic flow diagram of an image processing method provided by an embodiment of the present disclosure. Please refer to FIG. 2, the method can include the following steps.

S201, determining N texture images corresponding to a first image, and a correspondence between the N texture images and N model faces of a three-dimensional model.

An executive entity of the embodiment of the present disclosure may be a terminal device or an image processing apparatus disposed in the terminal device. The image processing apparatus may be realized by software, or by the combination of software and hardware.

Optionally, the first image may be an image in a video. For example, when a video is converted to a VR video, the first image may be each frame of image of the video, and a VR video corresponding to the video is obtained by converting each frame of image into a VR image.

Optionally, the first image may also be a depth image. For example, the first image may be any spatial image with image depth, such as a landscape image, a scene image, etc. By processing the first image, the first image can be converted into a VR image.

Optionally, a texture image may be an image including a texture of the first image. The texture is used to indicate a change of color and gray scale of the first image. For example, the image presents irregularity within a local region, but shows regularity on the whole, and such feature of being locally irregular but macroscopically regular is called a texture.

Optionally, the N texture images corresponding to the first image can be determined according to the following feasible implementation: processing the first image through a preset algorithm to obtain the N texture images corresponding to the first image. N is an integer greater than 1. For example, texture images corresponding to a video frame picture of a video can be acquired in the video frame picture through a model with an engine of rendering command buffer technology CommandBuffer. For example, when N is 6, 6 texture images corresponding to the first image can be acquired through the CommandBuffer technology.

Optionally, the three-dimensional model may be a cube model. For example, the structure of the three-dimensional model may be a cube, and when the three-dimensional model is a cube model, the three-dimensional model can include 6 model faces. Optionally, the correspondence is used to indicate a relationship between the texture images and each model face. For example, when the three-dimensional model is a cube model, the three-dimensional model includes 6 model faces. The number of texture images corresponding to the first image is 6, and each texture image has a corresponding model face.

Optionally, when acquiring the N texture images corresponding to the first image using the preset algorithm, the correspondence between the N texture images and N model faces of the three-dimensional model can be outputted. For example, a first texture image outputted by the preset algorithm corresponds to a left side face of the cube model, a second texture image corresponds to a front face of the cube model, a third texture image corresponds to a right side face of the cube model, a fourth texture image corresponds to a bottom face of the cube model, a fifth texture image corresponds to a back face of the cube model, and a sixth texture image corresponds to a top face of the cube model.

In the following, a process of determining a correspondence is illustrated in combination with FIG. 3.

Figure 3:
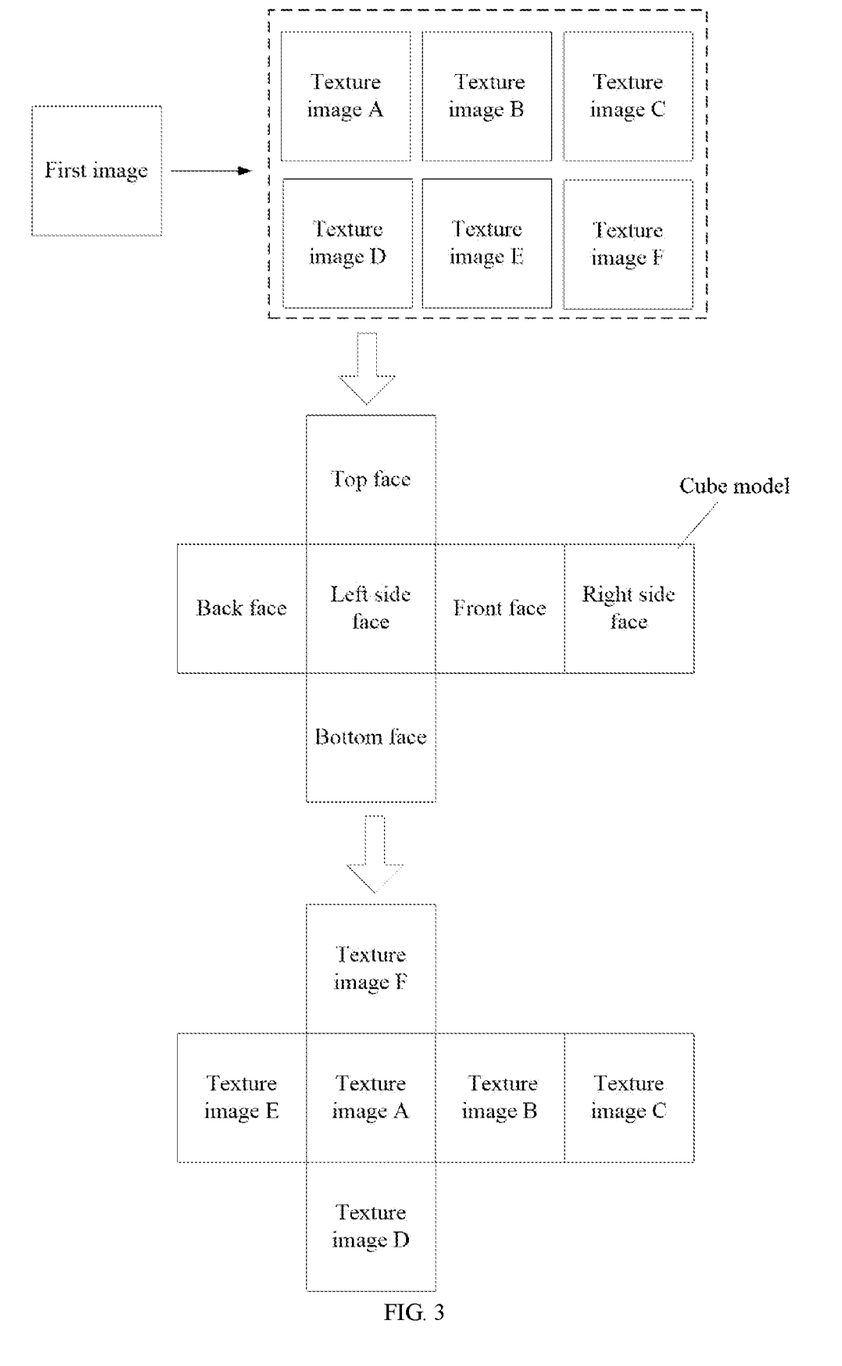
FIG. 3 is a schematic diagram of a process of determining a correspondence provided by an embodiment of the present disclosure.

FIG. 3 is a schematic diagram of a process of determining a correspondence provided by an embodiment of the present disclosure. Please refer to FIG. 3, which includes a first image and a cube model. The cube model is expanded into 6 faces. The first image is processed by a preset algorithm to obtain 6 texture images corresponding to the first image. Texture image A is the first texture image, texture image B is the second texture image, texture image C is the third texture image, texture image D is the fourth texture image, texture image E is the fifth texture image, and texture image F is the sixth texture image.

Please refer to FIG. 3, texture image A corresponds to the left side face of the cube model, texture image B corresponds to the front side of the cube model, texture image C corresponds to the right side face of the cube model, texture image D corresponds to the bottom face of the cube model, texture image E corresponds to the back face of the cube model, and texture image F corresponds to the top face of the cube model.

S202, determining, in the N texture images, a mapping region corresponding to each model face according to the correspondence and an offset coefficient.

Optionally, the mapping region is at least partial region of a texture image. For example, the mapping region may be an upper region, a lower region, a middle region of the texture image, etc. The three-dimensional model can acquire the mapping region in the texture image flexibly; thus improving flexibility of image mapping.

Optionally, the at least partial region may be the middle region of the texture image. For example, the mapping region of the model face of the three-dimensional model may be the middle region of the texture image (for example, a remaining region of the texture image after the side length thereof is trimmed by 0.5 pixels). In this way: the mapping region of the model face can be acquired accurately, so as to avoid occurrence of cracks between the model faces and improve a display effect of the three-dimensional model.

Optionally: the offset coefficient is used to adjust the size of the mapping region. For example, the terminal device can cut the periphery of the texture image by 0.5 pixel size through the offset coefficient to obtain the mapping region. Optionally, the mapping region corresponding to each model face can be determined in the N texture images according to the following feasible implementation: combining the N texture images into a region of L rows and K columns according to the correspondence to obtain a sampling region, and determining the mapping region corresponding to the model face according to the sampling region and the offset coefficient. A product of L and K is N, and L and K are positive integers. For example, if the number of texture images corresponding to the first image is 6, the terminal device can combine the 6 texture images into a sampling region of 2 rows and 3 columns.

In the following, a process of acquiring a sampling region is illustrated in combination with FIG. 4.

Figure 4:
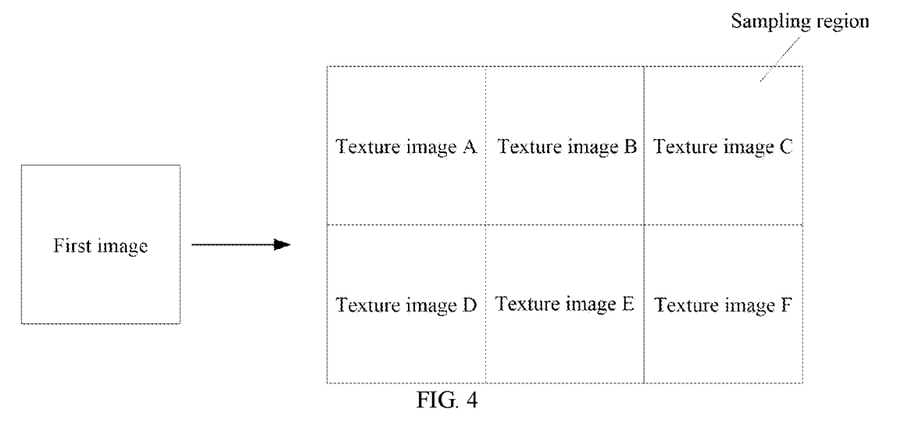
FIG. 4 is a schematic diagram of a process of acquiring a sampling region provided by an embodiment of the present disclosure.

FIG. 4 is a schematic diagram of a process of acquiring a sampling region provided by an embodiment of the present disclosure. Please refer to FIG. 4, which includes a first image. The first image is processed by a preset algorithm to obtain texture image A, texture image B, texture image C, texture image D, texture image E and texture image F. Because texture image A is the left side face of a cube model, texture image B is the front face of the cube model, texture image C is the right side face of the cube model, texture image D is the bottom face of the cube model, texture image E is the back face of the cube model, and texture image F is the top face of the cube model, 6 texture images can be combined into a sampling region of 2 rows and 3 columns. The first row of the sampling region includes texture image A, texture image B and texture image C. and the second row of the sampling region includes texture image D, texture image E and texture image F.

Optionally: determining the mapping region corresponding to the model face according to the sampling region and the offset coefficient is specifically: for any model face, determining a first position of the texture image corresponding to the model face in the sampling region. For example, the sampling region corresponding to the cube model is the sampling region shown in FIG. 4. If the model face of the cube model is the bottom face, the first position of the texture image corresponding to the bottom face in the sampling region is the image in the second row and the first column.

Vertex texture coordinates of the model face are acquired. The vertex texture coordinates include vertex texture abscissas and vertex texture ordinates. For example, each model face of the cube model includes 4-vertices texture coordinates. Optionally, the minimum value of the vertex texture abscissas and the vertex texture ordinates is 0), and the maximum value thereof is 1. For example, the model face of the cube model includes 4-vertices texture coordinates, where the 4-vertices texture coordinates are (0,0), (0,1), (1,0) and (1,1), respectively.

Vertex sampling coordinates are determined in the sampling region according to the vertex texture coordinates, the offset coefficient and the first position. The vertex sampling coordinates are vertex coordinates of the mapping region. For example, each vertex texture coordinate of the model face includes the corresponding vertex sampling coordinate in the mapping region, and the mapping region can be acquired in the sampling region through the vertex sampling coordinates. Optionally, the vertex sampling coordinates can be determined according to the following feasible implementation: determining abscissas of the vertex sampling coordinates according to the vertex texture coordinates, the first position, the number of columns of the sampling region and the offset coefficient. The first position can be represented by the row and column of the sampling region. For example, the first position may be an image position of the first row and the first column of the sampling region, and the first position may also be an image position of the second row and the third column of the sampling region.

Optionally, the abscissa of the vertex sampling coordinates can be determined according to the following formula:

$$targetCol = \mod(destIndex/columnNum)$$

$$x' = x/columnNum + targetCol/columnNum \times scalePercent.x$$

where targetCol is used to indicate the column of the sampling region where the vertex sampling coordinates are located; destIndex is the serial number of the texture image (for example, the first texture image in the sampling region, etc: optionally, when N is 6, a value range of destIndex is 0-5): columnNum is the number of columns of the sampling region; scalePercent.x is the offset coefficient in the x direction: x is the abscissa of the vertex texture coordinates; x' is the abscissa of the vertex sampling coordinates.

Optionally, the above formula only shows the method of acquiring the abscissa of the vertex sampling coordinates in the form of an example, and other formulas or methods can also be used to determine the column of the sampling region where the vertex sampling coordinates are located (for example, when destIndex has a different value range, targetCol can be calculated by other formulas, or the abscissa of a sampling vertex can be acquired through a shader (Shader)), which is not limited for those skilled in the art.

Ordinates of the vertex sampling coordinates are determined according to the vertex texture coordinates, the first position, the number of columns of the sampling region, the number of rows of the sampling region and the offset coefficient.

Optionally, the ordinate of the vertex sampling coordinates can be determined according to the following formula:

$$targetRow = \text{floor}(destIndex, columnNum)$$

$$y' = y/rowNum + targetRow/rowNum \times scalePercent.y$$

where targetRow is used to indicate the row of the sampling region where the vertex sampling coordinates are located; destIndex is the serial number of the texture image (for example, the first texture image in the sampling region, etc: optionally, when N is 6, a value range of destIndex is 0-5): columnNum is the number of columns of the sampling region; rowNum is the number of rows of the sampling region; scalePercent.y is the offset coefficient in the y direction: y is the ordinate of the vertex texture coordinates; y' is the ordinate of the vertex sampling coordinates.

Optionally, the above formula only shows the method of acquiring the ordinate of the vertex sampling coordinates in the form of an example, and other formulas or methods can also be used to determine the row of the sampling region where the vertex sampling coordinates are located (for example, when destIndex has a different value range, targetRow can also be calculated by other formulas, or the ordinate of a sampling vertex can be acquired through a shader (Shader)), which is not limited for those skilled in the art.

The vertex sampling coordinates are obtained according to the abscissas of the vertex sampling coordinates and the ordinates of the vertex sampling coordinates. A pixel spacing (pixel difference) between texture images can be determined accurately through the sampling region. When determining the mapping region of the model face, the terminal device can adjust the vertex sampling coordinates of each model face according to the offset coefficient, and then acquire the mapping region of each model face in the sampling region flexibly according to the vertex sampling coordinates, so as to improve the flexibility and accuracy of acquiring the mapping region, and then improve the display effect of the three-dimensional model.

The mapping region corresponding to the model face is determined according to the vertex sampling coordinates and the first position. Optionally, when the number of rows of the sampling region is 2, there are two cases for determining the mapping region corresponding to the model face according to the vertex sampling coordinates and the first position as follows:

case 1: the first position is in the first row of the sampling region.

If the first position is in the first row of the sampling region, the mapping region corresponding to the model face is determined according to the vertex sampling coordinates. For example, when the sampling region includes 2 rows and 3 columns, the sampling region includes 6 texture images. If the texture image is located in the first row; the mapping region corresponding to the model face is determined according to the vertex sampling coordinates. Optionally, if the texture image is located in the first row of the sampling region, a first region corresponding to the vertex sampling coordinates in the sampling region is determined, and the first region is determined as the mapping region corresponding to the model face. For example, a region can be acquired in the sampling region through 4-vertices sampling coordinates or 2-vertices sampling coordinates (such as vertex sampling coordinates of diagonal vertices), and then this region is determined as the mapping region of the model face. In this way, when the vertex sampling coordinates are located in the first row: the terminal device can determine the mapping region of the model face quickly and accurately according to the vertex sampling coordinates.

In the following, a process of determining a mapping region is illustrated in combination with FIG. 5.

Figure 5:
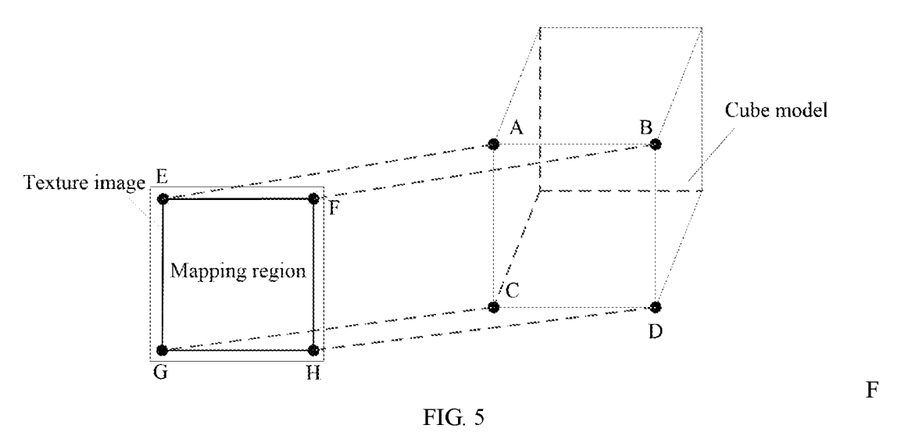
FIG. 5 is a schematic diagram of a process of determining a mapping region provided by an embodiment of the present disclosure.

FIG. 5 is a schematic diagram of a process of determining a mapping region provided by an embodiment of the present disclosure. Please refer to FIG. 5, which includes a texture image and a cube model. The front face of the cube model includes texture vertex A, texture vertex B, texture vertex C and texture vertex D. The texture image is an image corresponding to the front face of the cube model. The texture image includes sampling vertex E, sampling vertex F, sampling vertex G. and sampling vertex H. Texture vertex A corresponds to sampling vertex E, texture vertex B corresponds to sampling vertex F, texture vertex C corresponds to sampling vertex G. and texture vertex D corresponds to sampling vertex H. A region enclosed by sampling vertex E, sampling vertex F, sampling vertex G and sampling vertex H is the mapping region of the front face of the cube model. In this way, when the cube model acquires the mapping region of the model face, the size of the mapping region can be adjusted flexibly to avoid cracks between the model faces, thereby improving the display effect of the three-dimensional image, and improving the flexibility of three-dimensional image acquisition.

Case 2: the first position is in the second row of the sampling region.

If the first position is in the second row of the sampling region, flipping processing of a preset angle is performed on the vertex sampling coordinates to obtain target vertex sampling coordinates, and the mapping region corresponding to the model face is determined according to the target vertex sampling coordinates. For example, during a practical application, if the texture image is located in the second row of the sampling region, the texture image is an image rotated 90 degrees to the right in the sampling region. Therefore, when the texture image is located in the second row of the sampling region, the obtained vertex sampling coordinates can be rotated 90 degrees to the left to obtain the target vertex sampling coordinates, and then the mapping region displayed in a right direction can be acquired through the target vertex sampling coordinates.

Optionally, the flipping processing of the preset angle can be performed on the vertex sampling coordinates according to the following formula:

$$xyscale = vec2(1.0/columnNum, 1.0/rowNum)$$

$$xyBegin = vec2(targetCol/columnNum, targetRow/rowNum)$$

$$xyEnd =$$

$$vec2(xyscale.x + targetCol/columnNum, xyscale.y + targetRow/rowNum)$$

$$x' = (y' - xyBegin.y) \times xyscale.x/xyscale.y + xyBegin.x$$

$$y' = (xyEnd.x - x') \times xyscale.y/xyscale.x + xyBegin.y$$

where targetRow is used to indicate the row of the sampling region where the vertex sampling coordinates are located; targetCol is used to indicate the column of the sampling region where the vertex sampling coordinates are located; columnNum is the number of columns of the sampling region; rowNum is the number of rows of the sampling region; xyscale is a xy ratio of a two-dimensional vector (for example, if rowNum is 2, xyscale.y is 0.5); xyBegin is a two-dimensional vector of a beginning position of xy; xyEnd is a two-dimensional vector of an ending position of xy; x' is the abscissa of the vertex sampling coordinates; y' is the ordinate of the vertex sampling coordinates.

Optionally, the above formula can be used to perform the flipping processing of the preset angle (e.g., flipping processing of 90 degrees) on the vertex sampling coordinates.

The above formula is only an example, not a limitation on the flipping manner. Coordinates flipping may also be performed using other methods (e.g., flipping sample vertex coordinates through a shader (Shader)), which is not limited in the embodiments of the present disclosure.

Optionally, determining the mapping region corresponding to the model face according to the target vertex sampling coordinates is specifically: determining a second region corresponding to the target vertex sampling coordinates in the sampling region, and determining the second region as the mapping region corresponding to the model face. For example, a region can be acquired in the sampling region through 4-vertices sampling coordinates or 2-vertices sampling coordinates (such as target vertex sampling coordinates of diagonal vertices), and then this region is determined as the mapping region of the model face. In this way, by flipping the vertex sampling coordinates in the second row; the mapping region displayed in the right direction can be acquired, thereby improving the display effect of the three-dimensional model.

S203, mapping regions in the N texture images to the three-dimensional model to obtain a three-dimensional image corresponding to the first image.

Optionally: the mapping region of each texture image can be mapped to the model face of the three-dimensional model which corresponds to the each texture image to obtain the three-dimensional image corresponding to the first image. For example, if the mapping region of texture image A is region A. and the model face corresponding to texture image A is model face A, then region A is mapped to model face A: if the mapping region of texture image B is region B. and the model face corresponding to texture image B is model face B, then region B is mapped to model face B. Through the above method, each mapping region can be mapped to the corresponding model face to obtain the three-dimensional image corresponding to the first image.

Optionally, the terminal device can process each frame of image of the video to obtain the three-dimensional image corresponding to the video. For example, the terminal device can acquire 6 texture images corresponding to each frame of image of the video in real time; determine 6 mapping regions corresponding to each frame of image through the correspondence and the offset coefficient: and obtain the VR video corresponding to the video by mapping the 6 mapping regions of each frame of image to the model faces of the cube model.

The embodiment of the present disclosure provides an image processing method. The N texture images corresponding to the first image, and the correspondence between the N texture images and the N model faces of the three-dimensional model are determined. The N texture images are combined into the region of L rows and K columns according to the correspondence to obtain the sampling region. The mapping regions corresponding to the model faces are determined according to the sampling region and the offset coefficient, where the mapping region is at least partial region of the texture image. The mapping regions in the N texture images are mapped to the three-dimensional model to obtain the three-dimensional image corresponding to the first image. In this way, when the texture images have poor quality, the terminal device can acquire the mapping regions in the texture images flexibly through the correspondence and the offset coefficient, which can not only improve the display effect of the VR image, but also improve the flexibility of VR image acquisition.

On the basis of the embodiment shown in FIG. 2, the above image processing method also includes a method for determining an offset coefficient. In the following, a method for determining an offset coefficient is illustrated in combination with FIG. 6.

Figure 6:
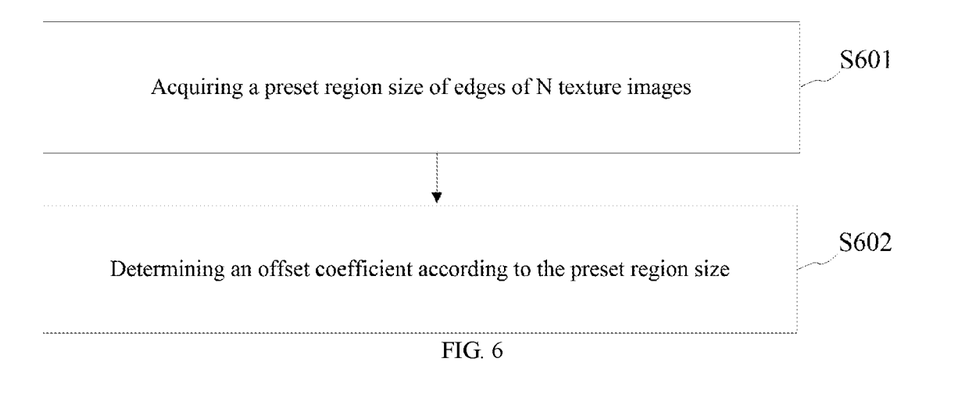
FIG. 6 is a schematic flow diagram of a method for determining an offset coefficient provided by an embodiment of the present disclosure.

FIG. 6 is a schematic flow diagram of a method for determining an offset coefficient provided by an embodiment of the present disclosure. Please refer to FIG. 6, a process of the method includes the following steps.

S601, acquiring a preset region size of edges of N texture image.

Optionally, a preset region can be a black edge region of a texture image. For example, when N texture images corresponding to a first image are obtained by a preset algorithm, if the first image has poor image quality (for example, the image resolution is low; the image has black edges, etc.), the extracted texture images also have black edge regions at edges. For example, when the N texture images are used to form a sampling region, there will also be small black edge regions (black edges caused by pixel differences) between the edges (at the junctions) of the texture images.

Optionally, the preset region size can be acquired through an image detection algorithm. For example, when the texture image corresponding to the first image is obtained, the size of the black edge region at an edge of the texture image can be determined by the image detection algorithm. When the sampling region is obtained, the size of a black edge in the sampling region can also be detected by the image detection algorithm.

S602, determining an offset coefficient according to the preset region size.

Optionally, the offset coefficient can be determined according to the following feasible implementation: acquiring a first preset relationship. The first preset relationship includes at least one region size and a coefficient corresponding to each region size. For example, the first preset relationship can be as shown in Table 1:

TABLE 1

| Region size | Coefficient |
| --- | --- |
| region size 1 | coefficient 1 |
| region size 2 | coefficient 2 |
| region size 3 | coefficient 3 |
| . . . | . . . |

It should be noted that Table 1 shows the first preset relationship only in a form of an example, rather than limiting the first preset relationship.

The offset coefficient is determined according to the preset region size and the first preset relationship. For example, if the preset region size is region size 1, the offset coefficient corresponding to the preset region size is coefficient 1: if the preset region size is region size 2, the offset coefficient corresponding to the preset region size is coefficient 2: if the preset region size is region size 3, the offset coefficient corresponding to the preset region size is coefficient 3.

Optionally, scaling processing can be performed on the texture image through the offset coefficient to obtain the mapping region. For example, when the offset coefficient is greater than 1, a mapping region larger than the size of the texture image can be acquired in the sampling region, and when the offset coefficient is less than 1, a mapping region smaller than the size of the texture image can be acquired in the sampling region.

The embodiment of the present disclosure provides a method for determining an offset coefficient. The preset region size of the edges of the N texture images are acquired and the first preset relationship is acquired, and then the offset coefficient is determined according to the preset region size and the first preset relationship. In this way, the terminal device can adjust the offset coefficient flexibly according to the preset region size, and then acquire the mapping regions without black edges in the texture images flexibly and accurately according to the offset coefficient. Since the mapping regions do not include the black edge regions, the display effect of the VR image can be improved, and thus the flexibility of VR image acquisition can be improved.

On the basis of any of the above embodiments, a process of the above image processing method is illustrated in the following in combination with FIG. 7.

Figure 7:
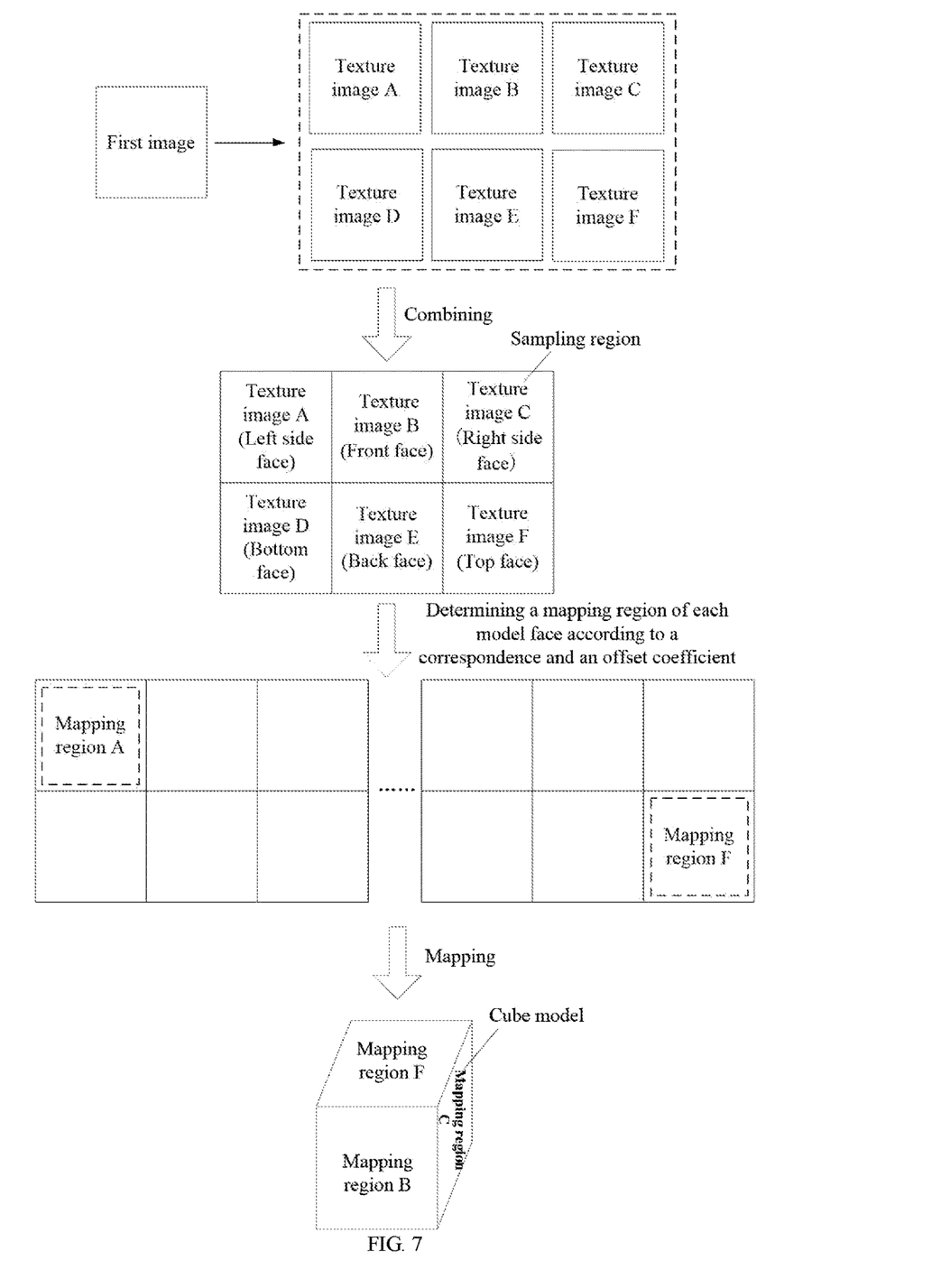
FIG. 7 is a schematic diagram of a process of an image processing method provided by an embodiment of the present disclosure.

FIG. 7 is a schematic diagram of a process of an image processing method provided by an embodiment of the present disclosure. Please refer to FIG. 7, which includes a first image and a cube model. The first image is processed by a preset algorithm to obtain texture images corresponding to the first image, where the texture images include texture image A, texture image B, texture image C, texture image D, texture image E and texture image F. The texture images are combined to obtain a sampling region of 2 rows and 3 columns according to a correspondence between the texture images and each model face. Texture image A corresponds to the left side face, texture image B corresponds to the front face, texture image C corresponds to the right side face, texture image D corresponds to the bottom face, texture image E corresponds to the back face, and texture image F corresponds to the top face.

Please refer to FIG. 7, a mapping region corresponding to each model face is determined according to the correspondence and an offset coefficient. When determining the mapping region of the left side face of the cube model, mapping region A is acquired at a position of the first row and the first column of the sampling region. Using the same method, the mapping region corresponding to each face of the cube model in the sampling region can be acquired (for example, the mapping region corresponding to the top face is mapping region F). The mapping regions are mapped to the corresponding cube model to obtain a three-dimensional image corresponding to the first image. Mapping region A is mapped to the left side face, mapping region B is mapped to the front face, mapping region C is mapped to the right side face, mapping region D is mapped to the bottom face, mapping region E is mapped to the back face, and mapping region F is mapped to the top face. In this way, when acquiring the mapping region for the cube model, the range of the mapping region corresponding to the model face can be adjusted flexibly according to the correspondence and the offset coefficient, and the size difference between the mapping region and the texture image can be within 1 pixel (for example, 0.5 pixels can be cut off from the edge of the texture image, leaving the mapping region), thus avoiding cracks between the three-dimensional model faces, improving the display effect of the three-dimensional image, and improving the flexibility of three-dimensional image acquisition.

Figure 8:
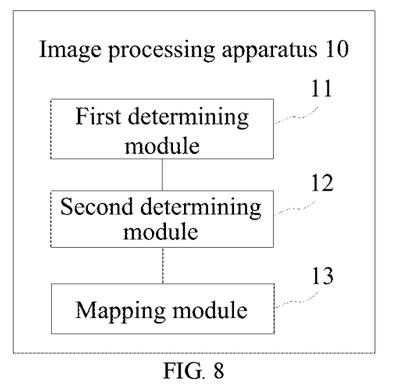
FIG. 8 is a schematic structural diagram of an image processing apparatus provided by an embodiment of the present disclosure.

FIG. 8 is a schematic structural diagram of an image processing apparatus provided by an embodiment of the present disclosure. Please refer to FIG. 8, the image processing apparatus 10 includes a first determining module 11, a second determining module 12 and a mapping module 13.

The first determining module 11 is configured to determine N texture images corresponding to a first image, and a correspondence between the N texture images and N model faces of a three-dimensional model, where N is an integer greater than 1.

The second determining module 12 is configured to determine a mapping region corresponding to each model face in the N texture images according to the correspondence and an offset coefficient, where the mapping region is at least partial region of a texture image.

The mapping module 13 is configured to map mapping regions in the N texture images to the three-dimensional model to obtain a three-dimensional image corresponding to the first image.

In one or more embodiments of the present disclosure, the second determining module 12 is specifically configured to:
combine the N texture images into a region of L rows and K columns according to the correspondence to obtain a sampling region, where a product of L and K is N, and L and K are positive integers;
determine the mapping region corresponding to the model face according to the sampling region and the offset coefficient.

In one or more embodiments of the present disclosure, the second determining module 12 is specifically configured to:
determine a first position of the texture image corresponding to the model in the sampling region;
acquire vertex texture coordinates of the model face;
determine vertex sampling coordinates in the sampling region according to the vertex texture coordinates, the offset coefficient and the first position;
determine the mapping region corresponding to the model face according to the vertex sampling coordinates and the first position.

In one or more embodiments of the present disclosure, the second determining module 12 is specifically configured to:
determine abscissas of the vertex sampling coordinates according to vertex texture abscissas, the first position, the number of columns of the sampling region and the offset coefficient;
determine ordinates of the vertex sampling coordinates according to vertex texture ordinates, the first position, the number of columns of the sampling region, the number of rows of the sampling region and the offset coefficient;
obtain the vertex sampling coordinates according to the abscissas of the vertex sampling coordinates and the ordinates of the vertex sampling coordinates.

In one or more embodiments of the present disclosure, the second determining module 12 is specifically configured to:
if the first position is located in a first row of the sampling region, determine the mapping region corresponding to the model face according to the vertex sampling coordinates;
if the first position is located in a second row of the sampling region, perform flipping processing of a preset angle on the vertex sampling coordinates to obtain target vertex sampling coordinates, and determine the mapping region corresponding to the model face according to the target vertex sampling coordinates.

In one or more embodiments of the present disclosure, the second determining module 12 is specifically configured to:
determine a first region corresponding to the vertex sampling coordinates in the sampling region;
determine the first region as the mapping region corresponding to the model face.

In one or more embodiments of the present disclosure, the second determining module 12 is specifically configured to:
determine a second region corresponding to the target vertex sampling coordinates in the sampling region;
determine the second region as the mapping region corresponding to the model face.

The image processing apparatus provided in this embodiment can be used to implement the technical solutions of the above method embodiments. Implementation principles and technical effects thereof are similar, which will not be repeated here in this embodiment.

Figure 9:
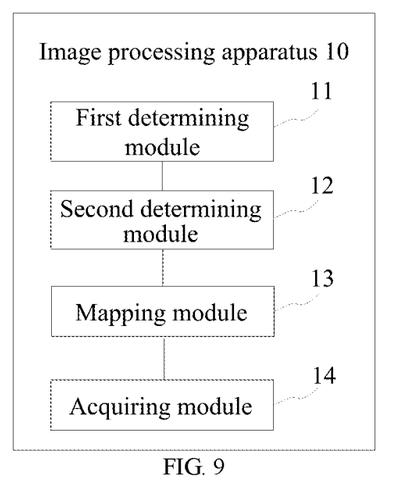
FIG. 9 is a schematic structural diagram of another image processing apparatus provided by an embodiment of the present disclosure.

FIG. 9 is a schematic structural diagram of another image processing apparatus provided by an embodiment of the present disclosure. On the basis of the embodiment shown in FIG. 8, please refer to FIG. 9, the image processing apparatus 10) also includes an acquiring module 14. The acquiring module 14 is configured to:
acquire a preset region size of edges of the N texture image edges;
determine the offset coefficient according to the preset region size.

In one or more embodiments of the present disclosure, the acquiring module 14 is specifically configured to:
acquire a first preset relationship, where the first preset relationship includes at least one region size and a coefficient corresponding to each region size;
determine the offset coefficient according to the preset region size and the first preset relationship.

The image processing apparatus provided in this embodiment can be used to implement the technical solutions of the above method embodiments. Implementation principles and technical effects thereof are similar, which will not be repeated here in this embodiment.

Figure 10:
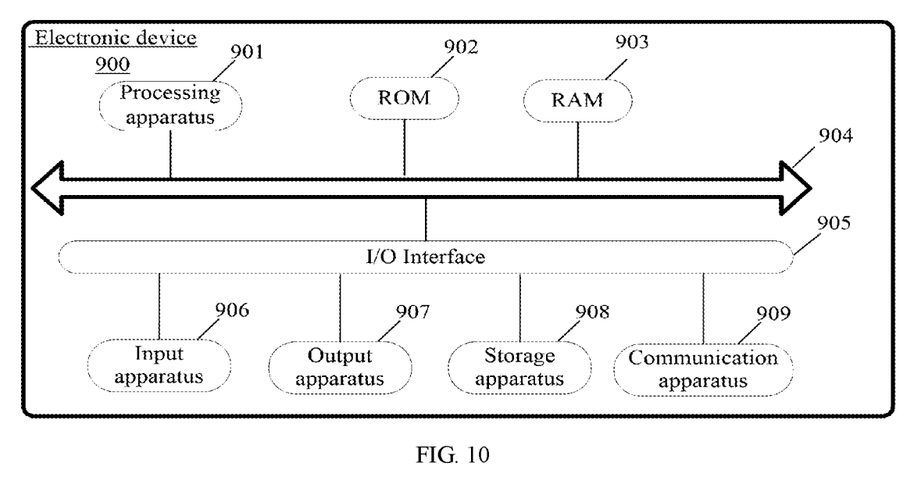
FIG. 10 is a schematic structural diagram of an electronic device provided by an embodiment of the present disclosure.

FIG. 10 is a schematic structural diagram of an electronic device provided by an embodiment of the present disclosure. Please refer to FIG. 10, which shows a schematic structural diagram of an electronic device 900 suitable for implementing embodiments of the present disclosure. The electronic device 900 may be a terminal device or a server. The terminal device may include but not limited to mobile terminals such as a mobile phone, a laptop, a digital radio receiver, a personal digital assistant (PDA), a portable Android device (PAD), a portable media player (PMP) and a vehicle terminal (such as a vehicle navigation terminal), and fixed terminals such as a digital TV and a desktop computer. The electronic device shown in FIG. 10 is only an example, which should not impose any limitation on functions and scope of use of the embodiments of the present disclosure.

As shown in FIG. 10, the electronic device 900 can include a processing apparatus (such as a central processing unit a graphics processor, etc.) 901, which can perform various appropriate actions and processing according to a program stored in a read only memory (ROM) 902 or a program loaded from a storage apparatus 908 into a random access memory (RAM) 903. In the RAM 903, various programs and data required for operations of the electronic device 900 are also stored. The processing apparatus 901, the ROM 902 and the RAM 903 are connected to each other via a bus 904. An input/output (I/O) interface 905 is also connected to the bus 904.

Generally; the following apparatuses can be connected to the I/O interface 905: an input apparatus 906 including, for example, a touch screen, a touchpad, a keyboard, a mouse, a camera, a microphone, an accelerometer, a gyroscope, etc: an output apparatus 907 including, for example, a liquid crystal display (LCD), a loudspeaker, a vibrator, etc: the storage apparatus 908 including, for example, a magnetic tape, a hard disk, etc: and a communication apparatus 909.

The communication apparatus 909 can allow the electronic device 900 to conduct wireless or wired communication with other devices to exchange data. Although FIG. 10 shows the electronic device 900 with various apparatuses, it should be understood that it is not required to implement or possess all of the shown apparatuses. Alternatively, more or fewer apparatuses can be implemented or possessed.

In particular, according to the embodiments of the present disclosure, the processes described above with reference to the flow diagrams can be implemented as computer software programs. For example, an embodiment of the present disclosure includes a computer program product which includes a computer program carried on a computer-readable medium, and the computer program includes program code for executing a method shown in a flow diagram. In such an embodiment, the computer program can be downloaded and installed from the network through the communication apparatus 909, or installed from the storage apparatus 908, or installed from the ROM 902. When the computer program is executed by the processing apparatus 901, the above functions defined in a method of an embodiment of the present disclosure are performed.

It should be noted that the computer-readable medium described above in the present disclosure may be a computer-readable signal medium, a computer-readable storage medium, or any combination of the two. The computer-readable storage medium, for example, may be—but is not limited to—an electrical, magnetic, optical, electromagnetic, infrared or semiconductor system, apparatus or device, or any combination of the above. More specific examples of the computer-readable storage medium may include, but are not limited to: an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium containing or storing a program, which may be used by or used in combination with an instruction execution system, apparatus, or device. In the present disclosure, the computer-readable signal medium may include data signals propagated in the baseband or as part of a carrier, in which computer-readable program code is carried. Such propagated data signals could take many forms, including but not limited to electromagnetic signals, optical signals, or any suitable combination of the above. The computer-readable signal medium may also be any computer-readable medium other than the computer-readable storage medium, which can send, propagate or transmit a program for use by or use in combination with an instruction execution system, apparatus or device. The program code contained on the computer-readable medium can be transmitted with any appropriate medium, including but not limited to: an electric line, an optical cable, radio frequency (RF) and so on, or any appropriate combination of the above.

The computer-readable medium described above may be included in the above electronic device, and may also exist independently without being assembled into the electronic device. The computer-readable medium described above carries one or more programs, and when the one or more programs are executed by the electronic device, the electronic device is caused to execute the methods shown in the above embodiments.

Computer program code for performing the operations of the present disclosure can be written in one or more programming languages or a combination thereof, and the programming languages include object oriented programming languages such as Java. Smalltalk. C++, and conventional procedural programming languages such as "C" or similar programming languages. The program code can be executed completely on a user computer, executed partially on the user computer, executed as an independent software package, executed partially on the user computer and partially on a remote computer, or executed completely on the remote computer or server. In a case involving a remote computer, the remote computer can be connected to the user computer through any kind of network, including a local area network (LAN) or a wide area network (WAN), or can be connected to an external computer (for example, using an Internet service provider to connect through the Internet).

The flow diagrams and block diagrams in the accompanying drawings illustrate the possible architectures, functions and operations of the systems, methods and computer program products according to various embodiments of the present disclosure. In this regard, each block in the flow diagrams or block diagrams can represent a module, a program segment or a part of code that contains one or more executable instructions for implementing a specified logical function. It should also be noted that in some alternative implementations, the functions marked in the block may also occur in a different order from those marked in the drawings. For example, two consecutive boxes may actually be executed substantially in parallel, or they may sometimes be executed in reverse order, depending on the function involved. It should also be noted that each block in the block diagrams and/or flow diagrams, and the combination of the blocks in the block diagrams and/or flow diagrams, can be implemented with a dedicated hardware-based system that performs a specified function or operation, or can be implemented with a combination of dedicated hardware and computer instructions.

The units described in the embodiments of the present disclosure can be realized by software or hardware. The name of a unit does not constitute a limitation on the unit itself in some cases. For example, the first determining module may also be described as "a module that determines N texture images corresponding to a first image, and a correspondence between the N texture images and N model faces of a three-dimensional model".

The functions described above herein can be performed at least partially by one or more hardware logical components. For example, in a non-restrictive way, exemplary types of hardware logic components that can be used include: a field programmable gate array (FPGA), an application specific integrated circuit (ASIC), an application specific standard product (ASSP), a system on a chip (SOC), a complex programmable logic device (CPLD), etc.

In the context of the present disclosure, a machine-readable medium may be a tangible medium that could contain or store programs for use by an instruction executing system, apparatus or device, or for use in combination with the instruction executing system, apparatus or device. The machine-readable medium may be a machine-readable signal medium or a machine-readable storage medium. The machine-readable medium can include, but is not limited to, an electronic, magnetic, optical, electromagnetic, infrared or semiconductor system, apparatus or device, or any appropriate combination of the foregoing. More specific examples of the machine-readable storage medium can include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

In a first aspect, one or more embodiments of the present disclosure provide an image processing method, which includes:

determining N texture images corresponding to a first image, and a correspondence between the N texture images and N model faces of a three-dimensional model, where N is an integer greater than 1;

determining, in the N texture images, a mapping region corresponding to each model face according to the correspondence and an offset coefficient, where the mapping region is at least partial region of a texture image;

mapping regions in the N texture images to the three-dimensional model to obtain a three-dimensional image corresponding to the first image.

In one or more embodiments of the present disclosure, the at least partial region is a middle region of the texture image: determining, in the N texture images, the mapping region corresponding to each model face according to the correspondence and the offset coefficient includes:

combining the N texture images into a region of L rows and K columns according to the correspondence to obtain a sampling region, where a product of L and K is N, and L and K are positive integers;

determining the mapping region corresponding to the model face according to the sampling region and the offset coefficient.

In one or more embodiments of the present disclosure, for any model face, determining the mapping region corresponding to the model face according to the sampling region and the offset coefficient includes:

determining a first position of the texture image corresponding to the model face in the sampling region;

acquiring vertex texture coordinates of the model face;

determining vertex sampling coordinates in the sampling region according to the vertex texture coordinates, the offset coefficient and the first position;

determining the mapping region corresponding to the model face according to the vertex sampling coordinates and the first position.

In one or more embodiments of the present disclosure, the vertex texture coordinates include vertex texture abscissas and vertex texture ordinates: determining the vertex sampling coordinates in the sampling region according to the vertex texture coordinates, the offset coefficient and the first position includes:

determining abscissas of the vertex sampling coordinates according to the vertex texture abscissas, the first position, the number of columns of the sampling region and the offset coefficient;

obtaining the vertex sampling coordinates are obtained according to the abscissas of the vertex sampling coordinates and the ordinates of the vertex sampling coordinates.

In one or more embodiments of the present disclosure, the number of rows in the sampling region is 2: determining the mapping region corresponding to the model face according to the vertex sampling coordinates and the first position includes:

if the first position is located in a first row of the sampling region, determining the mapping region corresponding to the model face according to the vertex sampling coordinates;

if the first position is located in a second row of the sampling region, performing flipping processing of a preset angle on the vertex sampling coordinates to obtain target vertex sampling coordinates, and determining the mapping region corresponding to the model face according to the target vertex sampling coordinates.

In one or more embodiments of the present disclosure, determining the mapping region corresponding to the model face according to the vertex sampling coordinates includes:

determining a first region corresponding to the vertex sampling coordinates in the sampling region;

determining the first region as the mapping region corresponding to the model face.

In one or more embodiments of the present disclosure, determining the mapping region corresponding to the model face according to the target vertex sampling coordinates includes:

determining a second region corresponding to the target vertex sampling coordinates in the sampling region;

determining the second region as the mapping region corresponding to the model face.

In one or more embodiments of the present disclosure, before determining, in the N texture images, the mapping region corresponding to each model face according to the correspondence and the offset coefficient, the method also includes:

acquiring a preset region size of edges of the N texture images;

determining the offset coefficient according to the preset region size.

In one or more embodiments of the present disclosure, determining the offset coefficient according to the preset region size includes:

acquiring a first preset relationship, where the first preset relationship includes at least one region size and a coefficient corresponding to each region size;

determining the offset coefficient according to the preset region size and the first preset relationship.

In a second aspect, one or more embodiments of the present disclosure provide an image processing apparatus, which includes a first determining module, a second determining module and a mapping module, where:

the first determining module is configured to determine N texture images corresponding to a first image, and a correspondence between the N texture images and N model faces of a three-dimensional model, where N is an integer greater than 1;

the second determining module is configured to determine, in the N texture images, a mapping region corresponding to each model face according to the correspondence and an offset coefficient, where the mapping region is at least partial region of a texture image;

the mapping module is configured to map mapping regions in the N texture images to the three-dimensional model to obtain a three-dimensional image corresponding to the first image.

In one or more embodiments of the present disclosure, the second determining module is specifically configured to:

combine the N texture images into a region of L rows and K columns according to the correspondence to obtain a sampling region, where a product of L and K is N, and L and K are positive integers;

determine the mapping region corresponding to the model face according to the sampling region and the offset coefficient.

In one or more embodiments of the present disclosure, the second determining module is specifically configured to:

determine a first position of the texture image corresponding to the model in the sampling region;

acquire vertex texture coordinates of the model face;

determine vertex sampling coordinates in the sampling region according to the vertex texture coordinates, the offset coefficient and the first position;

determine the mapping region corresponding to the model face according to the vertex sampling coordinates and the first position.

In one or more embodiments of the present disclosure, the second determining module is specifically configured to:

determine abscissas of the vertex sampling coordinates according to vertex texture abscissas, the first position, the number of columns of the sampling region and the offset coefficient;

determine ordinates of the vertex sampling coordinates according to vertex texture ordinates, the first position, the number of columns of the sampling region, the number of rows of the sampling region and the offset coefficient;

obtain the vertex sampling coordinates according to the abscissas of the vertex sampling coordinates and the ordinates of the vertex sampling coordinates.

In one or more embodiments of the present disclosure, the second determining module is specifically configured to:

if the first position is located in a first row of the sampling region, determine the mapping region corresponding to the model face according to the vertex sampling coordinates;

if the first position is located in a second row of the sampling region, perform flipping processing of a preset angle on the vertex sampling coordinates to obtain target vertex sampling coordinates, and determine the mapping region corresponding to the model face according to the target vertex sampling coordinates.

In one or more embodiments of the present disclosure, the second determining module is specifically configured to:

determine a first region corresponding to the vertex sampling coordinates in the sampling region;

determine the first region as the mapping region corresponding to the model face.

In one or more embodiments of the present disclosure, the second determining module is specifically configured to:

determine a second region corresponding to the target vertex sampling coordinates in the sampling region;

determine the second region as the mapping region corresponding to the model face.

In one or more embodiments of the present disclosure, the image processing apparatus also includes an acquiring module, where the acquiring module is configured to:

acquire a preset region size of edges of the N texture images;

determine the offset coefficient according to the preset region size.

In one or more embodiments of the present disclosure, the acquiring module is specifically configured to:

acquire a first preset relationship, where the first preset relationship includes at least one region size and a coefficient corresponding to each region size;

determine the offset coefficient according to the preset region size and the first preset relationship.

In a third aspect, an embodiment of the present disclosure provides an electronic device, which includes a processor and a memory:

the memory stores computer execution instructions;

the processor executes the computer execution instructions stored in the memory, so that the processor executes the image processing methods as described in the first aspect above and in various possible designs of the first aspect.

In a fourth aspect, an embodiment of the present disclosure provides a computer-readable storage medium having computer execution instructions stored therein, where the image processing method as described in the first aspect above and in various possible designs of the first aspect is implemented when a processor executes the computer execution instructions.

In a fifth aspect, an embodiment of the present disclosure provides a computer program product including a computer program, where the image processing methods as described in the first aspect above and in various possible designs of the first aspect is implemented when the computer program is executed by a processor.

In a sixth aspect, an embodiment of the present disclosure provides a computer program, where the image processing method as described in the first aspect above and in various possible designs of the first aspect is implemented when the computer program is executed by a processor.

The above description is only preferred embodiments of the present disclosure and an explanation of the applied technical principles. Those skilled in the art should understand that the scope of disclosure involved in the present disclosure is not limited to the technical solutions formed by particular combinations of the technical features mentioned above, but should also cover other technical solutions formed by any combination of the technical features mentioned above or their equivalent features without departing from the above mentioned concepts of disclosure, for example, a technical solution formed by substituting the above features and the technical features (but not limited to) with similar functions as those disclosed in the present disclosure for one another.

Furthermore, although the operations are described in a particular order, this should not be understood as requiring the operations to be performed in the particular order shown or in a sequential order. Under certain circumstances, multitasking and parallel processing may be beneficial. Similarly, although the above discussion contains a number of specific implementation details, these should not be interpreted as limiting the scope of the disclosure. Certain features described in the context of separate embodiments can also be implemented in a single embodiment in combination. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the attached claims is not necessarily limited to the specific features or actions described above. On the contrary, the specific features and actions described above are only examples of implementing the claims.

What is claimed is:

1. An image processing method, comprising:
determining N texture images corresponding to a first image, and a correspondence between the N texture images and N model faces of a three-dimensional model, wherein N is an integer greater than 1;
determining, in the N texture images, a mapping region corresponding to each of the N model faces according to the correspondence and an offset coefficient, wherein the mapping region is an at least partial region of a texture image; and
mapping mapping regions in the N texture images to the three-dimensional model to obtain a three-dimensional image corresponding to the first image.

2. The method according to claim 1, wherein the at least partial region is a middle region of the texture image; determining, in the N texture images, the mapping region corresponding to the each of the N model faces according to the correspondence and the offset coefficient comprises:
combining the N texture images into a region of L rows and K columns according to the correspondence to obtain a sampling region, wherein a product of L and K is N, and L and K are positive integers; and
determining the mapping region corresponding to the each of the N model faces according to the sampling region and the offset coefficient.

3. The method according to claim 2, wherein for any one of the N model faces, determining the mapping region corresponding to the each of the N model faces according to the sampling region and the offset coefficient comprises:
determining a first position of the texture image corresponding to the any one of the N model faces in the sampling region;
acquiring vertex texture coordinates of the any one of the N model faces;
determining vertex sampling coordinates in the sampling region according to the vertex texture coordinates, the offset coefficient and the first position; and
determining the mapping region corresponding to the any one of the N model faces according to the vertex sampling coordinates and the first position.

4. The method according to claim 3, wherein the vertex texture coordinates comprise vertex texture abscissas and vertex texture ordinates; determining the vertex sampling coordinates in the sampling region according to the vertex texture coordinates, the offset coefficient and the first position comprises:
determining abscissas of the vertex sampling coordinates according to the vertex texture abscissas, the first position, a number of columns of the sampling region and the offset coefficient;
determining ordinates of the vertex sampling coordinates according to the vertex texture ordinates, the first position, the number of columns of the sampling region, a number of rows of the sampling region and the offset coefficient; and
obtaining the vertex sampling coordinates according to the abscissas of the vertex sampling coordinates and the ordinates of the vertex sampling coordinates.

5. The method according to claim 3, wherein a number of rows of the sampling region is 2; determining the mapping region corresponding to the any one of the N model faces according to the vertex sampling coordinates and the first position comprises:
upon determining that the first position is located in a first row of the sampling region, determining the mapping region corresponding to the any one of the N model faces according to the vertex sampling coordinates; and
upon determining that the first position is located in a second row of the sampling region, performing flipping processing of a preset angle on the vertex sampling coordinates to obtain target vertex sampling coordinates, and determining the mapping region corresponding to the any one of the N model faces according to the target vertex sampling coordinates.

6. The method according to claim 5, wherein determining the mapping region corresponding to the any one of the N model faces according to the vertex sampling coordinates comprises:
determining a first region corresponding to the vertex sampling coordinates in the sampling region; and
determining the first region as the mapping region corresponding to the any one of the N model faces.

7. The method according to claim 5, wherein determining the mapping region corresponding to the any one of the N model faces according to the target vertex sampling coordinates comprises:
determining a second region corresponding to the target vertex sampling coordinates in the sampling region; and
determining the second region as the mapping region corresponding to the any one of the N model faces.

8. The method according to claim 1, before determining, in the N texture images, the mapping region corresponding to the each of the N model faces according to the correspondence and the offset coefficient, further comprising:
acquiring a preset region size of edges of the N texture images; and
determining the offset coefficient according to the preset region size.

9. The method according to claim 2, before determining, in the N texture images, the mapping region corresponding to the each of the N model faces according to the correspondence and the offset coefficient, further comprising:
acquiring a preset region size of edges of the N texture images; and
determining the offset coefficient according to the preset region size.

10. The method according to claim 8, wherein determining the offset coefficient according to the preset region size comprises:
acquiring a first preset relationship, wherein the first preset relationship comprises at least one region size and a coefficient corresponding to each region size; and
determining the offset coefficient according to the preset region size and the first preset relationship.

11. An image processing apparatus, comprising a memory and a processor;
the memory stores computer execution instructions;
the processor executes the computer execution instruction stored in the memory, so that the processor is configured to:
determine N texture images corresponding to a first image, and a correspondence between the N texture images and N model faces of a three-dimensional model, wherein N is an integer greater than 1;
determine, in the N texture images, a mapping region corresponding to each of the N model faces according to the correspondence and an offset coefficient, wherein the mapping region is an at least partial region of a texture image; and map mapping regions in the N texture images to the three-dimensional model to obtain a three-dimensional image corresponding to the first image.

12. The apparatus according to claim 11, wherein the at least partial region is a middle region of the texture image; the processor is configured to:
combine the N texture images into a region of L rows and K columns according to the correspondence to obtain a sampling region, wherein a product of L and K is N, and L and K are positive integers; and
determine the mapping region corresponding to the each of the N model faces according to the sampling region and the offset coefficient.

13. The apparatus according to claim 12, wherein for any one of the N model faces, the processor is configured to:
determine a first position of the texture image corresponding to the any one of the N model faces in the sampling region;
acquire vertex texture coordinates of the any one of the N model faces;
determine vertex sampling coordinates in the sampling region according to the vertex texture coordinates, the offset coefficient and the first position; and
determine the mapping region corresponding to the any one of the N model faces according to the vertex sampling coordinates and the first position.

14. The apparatus according to claim 13, wherein the vertex texture coordinates comprise vertex texture abscissas and vertex texture ordinates; the processor is configured to:
determine abscissas of the vertex sampling coordinates according to the vertex texture abscissas, the first position, a number of columns of the sampling region and the offset coefficient;
determine ordinates of the vertex sampling coordinates according to the vertex texture ordinates, the first position, the number of columns of the sampling region, a number of rows of the sampling region and the offset coefficient; and
obtain the vertex sampling coordinates according to the abscissas of the vertex sampling coordinates and the ordinates of the vertex sampling coordinates.

15. The apparatus according to claim 13, wherein a number of rows of the sampling region is 2; the processor is configured to:
upon determining that the first position is located in a first row of the sampling region, determine the mapping region corresponding to the any one of the N model faces according to the vertex sampling coordinates; and
upon determining that the first position is located in a second row of the sampling region, perform flipping processing of a preset angle on the vertex sampling coordinates to obtain target vertex sampling coordinates, and determine the mapping region corresponding to the any one of the N model faces according to the target vertex sampling coordinates.

16. The apparatus according to claim 15, wherein the processor is configured to:
determine a first region corresponding to the vertex sampling coordinates in the sampling region; and
determine the first region as the mapping region corresponding to the any one of the N model faces.

17. The apparatus according to claim 15, wherein the processor is configured to:
determine a second region corresponding to the target vertex sampling coordinates in the sampling region; and
determine the second region as the mapping region corresponding to the any one of the N model faces.

18. The apparatus according to claim 11, wherein the processor is further configured to:
acquire a preset region size of edges of the N texture images; and
determine the offset coefficient according to the preset region size.

19. The apparatus according to claim 18, wherein the processor is configured to:
acquire a first preset relationship, wherein the first preset relationship comprises at least one region size and a coefficient corresponding to each region size; and
determine the offset coefficient according to the preset region size and the first preset relationship.

20. A non-transitory computer-readable storage medium having computer execution instructions stored therein, wherein when the computer execution instructions are executed by a processer, the following operations are implemented:
determining N texture images corresponding to a first image, and a correspondence between the N texture images and N model faces of a three-dimensional model, wherein N is an integer greater than 1;
determining, in the N texture images, a mapping region corresponding to each of the N model faces according to the correspondence and an offset coefficient, wherein the mapping region is an at least partial region of a texture image; and
mapping mapping regions in the N texture images to the three-dimensional model to obtain a three-dimensional image corresponding to the first image.

* * * * *